June 16, 1959     C. I. BOHLEN     2,890,897
TRAILER WHEEL TOWING DEVICE
Filed Aug. 23, 1957
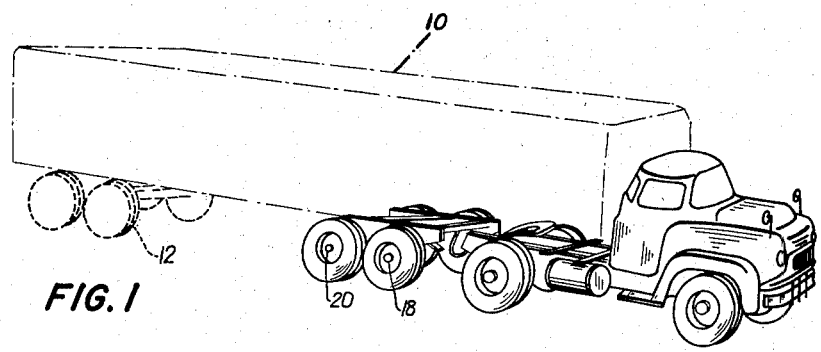
FIG. 1
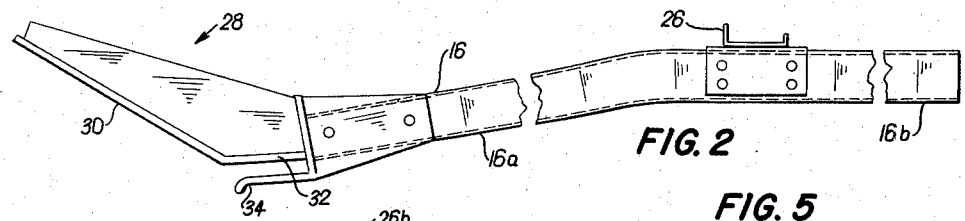
FIG. 2     FIG. 5
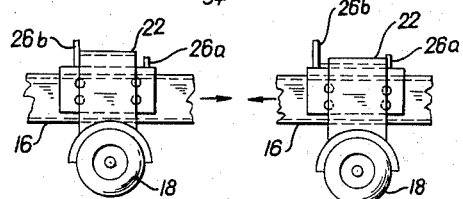 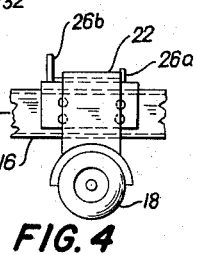 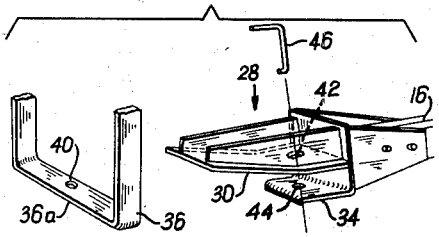
FIG. 3     FIG. 4
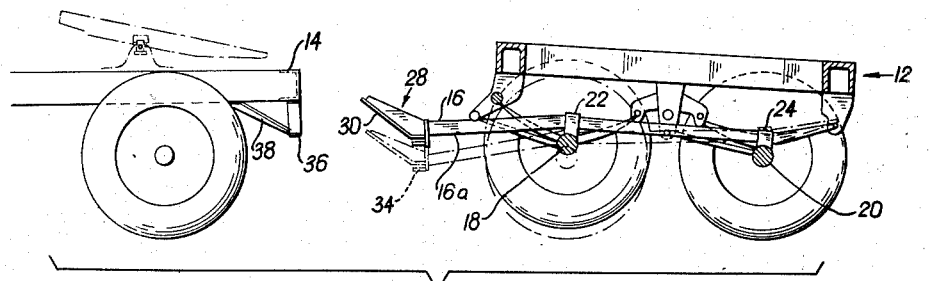
FIG. 6
INVENTOR.
Charles I. Bohlen
BY Curtis, Morris & Safford
Attorneys

2,890,897

TRAILER WHEEL TOWING DEVICE

Charles I. Bohlen, Doylestown, Pa., assignor to Leo L. Mellam, New York, N.Y.

Application August 23, 1957, Serial No. 679,848

4 Claims. (Cl. 280—491)

This invention relates to apparatus for towing a tandem axle trailer wheel assembly or "bogey" separate from a trailer body.

The invention is particularly useful in connection with a freight handling system of the general type disclosed in the copending applications Serial No. 637,462, filed January 31, 1957, and Serial No. 658,094, filed May 9, 1957, both of which applications are assigned to the same assignee as the present application. In this system, the trailer body is removable from the highway wheel assembly or bogey for transfer to a railway flat car. The bogey may then be towed away for use with other trailer bodies. One difficulty that is encountered in towing of the bogey separate from the trailer body is that, in turning a corner, there is a lateral scrubbing of the tires on either the front or rear wheels of the bogey, or both, due to the fact that the center of curvature about which the bogey turns is necessarily misaligned with at least one of the two axles of the bogey. This not only results in excessive wear of the tires but makes it difficult to maneuver the bogey.

It is accordingly among the objects of the present invention to provide an apparatus for towing a bogey which obviates the aforementioned difficulties. Another object is that of providing such an apparatus which may readily be attached to a truck tractor for towing and which when so attached will automatically lift the front wheels of the bogey off the ground a short distance so that the bogey is supported on its rear wheels only. Still another object is the provision of an apparatus which is simple and economical in construction and which may readily be attached to and detached from the bogey.

In the drawings, in which an illustrative embodiment of the invention is shown:

Figure 1 is a perspective view of a truck tractor towing a bogey, with the position occupied by the bogey when attached to a trailer body being shown in broken lines.

Figure 2 is a side elevational view of a tow bar apparatus embodying features of the present invention.

Figures 3 and 4 are fragmentary side elevational views of the tow bar of Figure 2, showing the hook means by which it releasably engages the front axle of the bogey, the two figures showing the tow bar in different stages or conditions or use.

Figure 5 is a fragmentary perspective view of the forward end of the tow bar and of the support member secured at the rear end of the truck tractor to illustrate their cooperative relation.

Figure 6 is a somewhat diagrammatic side elevational view of a bogey with the tow bar of Figures 2-5 inserted in proper position, and of a truck tractor incorporating a support member for cooperation with the tow bar in accordance with this invention.

In Figure 1, the broken lines show a trailer body 10 supported on a bogey 12 being towed by a truck tractor 14. As is disclosed in the aforementioned copending applications, when it is desired to transfer the trailer body 10 to a railway car, it is backed up against the side of the railway car and the locking device which normally holds the bogey 12 in fixed longitudinal position on the bottom of the trailer body 10 is disengaged. The truck tractor 14 is then backed up farther to push the trailer body onto the railway car, with the rail members which extend along the bottom of the trailer body 10 sliding off of the skids at the top of the bogey 12 and onto those of a turntable of the railway car, the turntable being turned transversely of the car to receive the trailer body. When the trailer body 10 reaches the position at which it is centered on the turntable, it is automatically locked in such position, the turntable is rotated to align the trailer body 10 lengthwise of the car, and the hydraulic cylinder which controls the elevation of the turntable is lowered so that the trailer body 10 is supported and held in place on the railway car.

The present invention provides apparatus for towing the bogey 12 away from the side of the railway car for storage or for further use. This apparatus includes a tow bar of the type shown in Figure 2. As may be seen in this figure, the tow bar, which is generally designated 16, is elongated and rigid and is bent so that its forward portion 16a extends downwardly from the main portion 16b at a slight angle. The main portion 16b of the tow bar is adapted to rest upon the two axles 18 and 20 of the bogey 12, as shown in Figure 6. The two axles 18 and 20 are respectively provided at their centers with yokes 22 and 24 which receive the bar 16 and which limit its lateral and vertical movement relative to the axles.

The tow bar 16 is provided with a hook assembly 26 which engages the yoke 22 on the front axle 18 of the bogey 12. This hook assembly 26 includes a relatively short upwardly projecting rear hook portion 26a and a longer front hook portion 26b. The upper end of the yoke 22 on the front axle 18 is spaced above the axle a distance sufficient that, when the tow bar 16 is inserted through the yoke, with the tow bar supported on the axle, the rear hook portion 26a may pass beneath the upper portion of the yoke 22, as shown in Figure 3. However, the front hook portion 26b extends upwardly for such a distance that it cannot pass through the yoke 22, even when the bar 16 is against the axle 18, as shown in Figure 3. Thus the front hook portion 26b limits the rearward movement of the bar 16 as it is inserted into position in the yokes 22 and 24, and facilitates proper positioning of the tow bar relative to the bogey.

The forward end of the bar 16 is provided with a latching assembly which is generally designated 28 and which includes a cam surface 30 which is inclined forwardly and upwardly and, adjoining the rear end of this cam surface 30, is a horizontal supporting surface 32. Spaced a short distance below the supporting surface 32 and arranged parallel thereto is a retaining plate 34. As best shown in Figures 5 and 6, the cam surface 30 is arranged to cooperate with a support member 36 which, in the particular embodiment shown, is merely a U-shaped strap secured to and depending from the rear end frame of the tractor 14, and reinforced by diagonal braces 38. As the truck tractor is backed up, the horizontal lower portion 36a of the support member 36 engages the cam surface 30 at the forward end of the tow bar 16 and cams the forward end upwardly, as shown in full lines in Figure 6. The tow bar 16 acts as a lever during this movement, with the rear end of the tow bar pivoting about the rear axle 20 of the bogey 12 as a fulcrum. This raises the front wheels of the bogey off the ground from the position shown in broken lines to that shown in full lines in Figure 6.

During this operation, the brakes of the bogey are locked by virtue of the fact that the air lines to the bogey are disconnected.

At the completion of the backing movement of the truck tractor 14, the lower portion 36a of the support member 36 will have entered the space between the horizontal support portion 32 and the retaining plate 34 of the latching assembly 28 at the front end of the tow bar. In this position, a hole 40 (Figure 5) in the center of the lower portion 36a of the support member 36 comes into alignment with holes 42 and 44 in the horizontal portion 32 and in the retaining plate 34, respectively, of the latching assembly 28. A latching pin 46 (Figure 5) is inserted through these aligned openings to secure the forward end of the tow bar to the support member 36 for towing, while permitting pivotal movement of the forward end of the tow bar relative to the support member for turning of the tractor and towed bogey.

The fact that the front wheels of the bogey are out of contact with the ground permits the bogey to turn a corner very easily, without any lateral scrubbing of the tires. This greatly enhances maneuverability of the bogey while at the same time greatly reducing tire wear.

When it is desired to disconnect the bogey from the tractor, the latching pin 46 is removed, the air lines are disconnected to lock the brakes of the bogey and the truck tractor is merely pulled away from the bogey. This will cause the lower portion 36a of the support member 36 on the truck tractor 14 to move from beneath the horizontal support portion 32 of the latching assembly 28 and along the inclined cam surface 30, allowing the front end of the tow bar to descend gradually, and lowering the front wheels of the bogey to the ground. The lowering of the front end of the tow bar will automatically disengage the rear hook portion 26a (Figures 3 and 4) of the tow bar from the yoke 22 of the front axle 18 of the bogey and allow the tow bar 16 to be slid longitudinally out of the bogey.

From the foregoing description, it will be appreciated that the present invention provides a trailer bogey towing device which is extremely simple and economical in construction, but which may be quickly and easily installed on the bogey, and which is so constructed that, when the truck tractor is backed into engagement with the bogey, the front wheels of the bogey will automatically be lifted off the ground to avoid the difficulties referred to hereinabove. It will thus be appreciated that the present invention accomplishes the aforementioned and other desirable objectives. However, it should be emphasized that the particular embodiment of the invention which is shown and described herein is intended as merely illustrative of the invention rather than as restrictive of the scope thereof or of the coverage of this patent, which is defined only by the appended claims.

I claim:

1. Apparatus for attaching a truck tractor to a tandem axle bogey for towing the latter separate from a trailer body, said apparatus comprising a tow bar adapted for engagement with two longitudinally spaced portions of said bogey in lever fashion, whereby lifting of the forward end of said tow bar lifts the front end of said bogey, cooperating portions on said tow bar and said bogey arranged for interengagement to permit towing of said bogey by said tow bar, a supporting member mounted at the rear end of said truck tractor for support of the forward end of said tow bar, cooperating cam surfaces on said supporting member and on the forward end of said tow bar whereby backing of said truck tractor against said tow bar will lift the forward end of said tow bar and the front wheels of said bogey, and latching means for releasably securing the forward end of said tow bar to said supporting member for pivotal movement about a vertical axis.

2. Apparatus for attaching a truck tractor to a tandem two-axle bogey for towing the latter separate from a trailer body, said apparatus comprising a tow bar adapted to engage the two axles of said bogey in lever fashion for the transmission of an upward force to the front axle and a downward reactive force to the rear axle, which acts as the fulcrum for such leverage, the forward end of said tow bar projecting from the forward end of said bogey, cooperating hook portions respectively provided on said tow bar and on one of said axles arranged for interengagement to permit towing of said bogey by said tow bar, a supporting member mounted at the rear end of said truck tractor for support of the forward end of said tow bar, cooperating cam surfaces on said supporting member and on the forward end of said tow bar whereby backing of said truck tractor against said tow bar will lift the forward end of said tow bar and the front wheels of said bogey, and latching means for releasably securing the forward end of said tow bar to said supporting member for pivotal movement about a vertical axis.

3. Apparatus for attaching a truck tractor to a tandem two-axle bogey for towing the latter separate from a trailer body, said apparatus comprising a tow bar adapted to rest upon the two axles of said bogey and to extend from the forward end of said bogey, a yoke member secured to each of said axles for receiving said tow bar and holding the same in position on said axles, a hook element on said tow bar adapted when the forward end of said tow bar is lifted to engage the yoke member on the front axle of said bogey, for the towing of said bogey, cooperating cam surfaces on said supporting member and on the forward end of said tow bar whereby backing of said truck tractor against said tow bar will lift the forward end of said tow bar and the front wheels of said bogey, and latching means for releasably securing the forward end of said tow bar to said supporting member for pivotal movement about a vertical axis.

4. Apparatus for attaching a truck tractor to a tandem axle bogey for towing the latter separate from a trailer body, said apparatus comprising a tow bar adapted for engagement with two longitudinally spaced portions of said bogey in lever fashion, whereby lifting of the forward end of said tow bar lifts the front end of said bogey, cooperating portions on said tow bar and said bogey arranged for interengagement to permit towing of said bogey by said tow bar, a supporting member mounted at the rear end of said truck tractor for support of the forward end of said tow bar, a hitching element at the forward end of said tow bar, said hitching element including an inclined cam surface adapted for camming engagement with said supporting element when said truck tractor is backed up to raise the forward end of said bogey and a horizontal supporting surface adjoining the rearward end of said cam surface for engaging a horizontal surface on said support member for pivotally supporting the forward end of said bogey in such raised position, and a latching pin linking said hitching element to said supporting element for pivotal movement about a vertical axis.

References Cited in the file of this patent
UNITED STATES PATENTS

| | | |
|---|---|---|
| 1,332,388 | Egan | Mar. 2, 1920 |
| 1,342,949 | Falco | June 8, 1920 |
| 1,424,788 | Westlake et al. | Aug. 8, 1922 |
| 2,038,156 | Alexander | Apr. 21, 1936 |
| 2,044,278 | Buquor | June 16, 1936 |
| 2,391,948 | Couse | Jan. 1, 1946 |
| 2,513,552 | Dove | July 4, 1950 |
| 2,703,659 | Hutchins | Mar. 8, 1955 |